US010125908B2

(12) United States Patent
Kujawski, Jr.

(10) Patent No.: US 10,125,908 B2
(45) Date of Patent: Nov. 13, 2018

(54) QUICK CONNECT FLUID COUPLING WITH INTEGRATED CHECK VALVE

(71) Applicant: Oetiker NY, Inc., Lancaster, NY (US)

(72) Inventor: James Kujawski, Jr., Attica, NY (US)

(73) Assignee: Oetiker NY, Inc., Lancaster, NY (US)

( * ) Notice: Subject to any disclaimer, the term of this patent is extended or adjusted under 35 U.S.C. 154(b) by 80 days.

(21) Appl. No.: 15/005,685

(22) Filed: Jan. 25, 2016

(65) Prior Publication Data

US 2016/0238173 A1     Aug. 18, 2016

Related U.S. Application Data

(60) Provisional application No. 62/117,635, filed on Feb. 18, 2015.

(51) Int. Cl.
*F16L 37/088* (2006.01)
*F16L 37/413* (2006.01)

(52) U.S. Cl.
CPC ........... *F16L 37/413* (2013.01); *F16L 37/088* (2013.01); *Y10T 137/7929* (2015.04)

(58) Field of Classification Search
CPC .. F16L 37/088; F16L 37/413; Y10T 137/7929
See application file for complete search history.

(56) References Cited

U.S. PATENT DOCUMENTS

| | | | |
|---|---|---|---|
| 857,897 A | 6/1907 | Patterson | |
| 2,377,812 A | 6/1945 | Scheiwer | |
| 2,868,563 A * | 1/1959 | Wood | F16L 37/086 137/614.04 |
| 3,052,261 A * | 9/1962 | Nyberg | A62C 33/00 137/614.04 |
| 3,199,831 A * | 8/1965 | Sully | A01G 25/16 141/349 |
| 3,245,423 A | 4/1966 | Hansen et al. | |
| 3,474,810 A | 10/1969 | Welsh | |
| 3,532,101 A | 10/1970 | Snyder, Jr. | |
| 4,391,459 A * | 7/1983 | Wicke | F16B 7/0413 285/238 |
| 4,436,125 A | 3/1984 | Blenkush | |
| 5,290,009 A * | 3/1994 | Heilmann | F16L 37/22 251/149.6 |
| 5,445,358 A * | 8/1995 | Anderson | F16L 37/38 251/149.6 |
| 5,452,924 A | 9/1995 | Kujawski | |
| 5,547,166 A * | 8/1996 | Engdahl | F16L 37/0848 251/149.6 |
| 5,607,139 A * | 3/1997 | Kjellberg | F16L 37/42 251/149.1 |

(Continued)

FOREIGN PATENT DOCUMENTS

EP         1557599      7/2005

*Primary Examiner* — Craig Schneider
*Assistant Examiner* — Frederick D Soski
(74) *Attorney, Agent, or Firm* — Simpson & Simpson PLLC

(57) ABSTRACT

A fluid coupling has an outlet for receiving the lead end of a tubular fluid conduit having an external locking shoulder. The coupling also holds within it adjacent an outlet a valve body that is normally closed, but is contacted and displaced against the closing force of a bias spring to open the outlet when the conduit is fully inserted and locked into the coupling by way of said locking shoulder.

19 Claims, 8 Drawing Sheets

(56) References Cited

U.S. PATENT DOCUMENTS

| | | | |
|---|---|---|---|
| 5,630,570 A * | 5/1997 | Lacroix | F16L 37/0985 |
| | | | 251/149.9 |
| 5,749,606 A | 5/1998 | Lu et al. | |
| 5,758,682 A | 6/1998 | Cain | |
| 5,806,832 A * | 9/1998 | Larbuisson | F16L 37/42 |
| | | | 251/149.6 |
| 5,816,298 A | 10/1998 | Stricklin et al. | |
| 5,909,901 A * | 6/1999 | Zillig | F16L 37/088 |
| | | | 285/308 |
| 6,343,630 B1 * | 2/2002 | Dubinsky | F16L 37/0848 |
| | | | 137/614.05 |
| 6,719,003 B2 * | 4/2004 | Schroeder | F16K 15/063 |
| | | | 137/234.5 |
| 6,890,004 B2 * | 5/2005 | Naito | F16L 37/22 |
| | | | 285/314 |
| 7,195,228 B2 | 3/2007 | Tiberghien et al. | |
| 7,311,231 B2 * | 12/2007 | Noell | A45F 3/20 |
| | | | 215/388 |
| 7,458,392 B2 | 12/2008 | Cornwell | |
| 7,618,070 B2 | 11/2009 | Stoll et al. | |
| 8,191,932 B2 * | 6/2012 | Davis | F16L 37/23 |
| | | | 137/614.05 |
| 8,267,376 B2 | 9/2012 | Hansen | |
| 8,303,000 B2 * | 11/2012 | Liu | F16L 37/23 |
| | | | 137/614.05 |
| 8,322,941 B2 | 12/2012 | Cermak | |
| 8,869,828 B2 | 10/2014 | Kamp et al. | |
| 9,322,500 B2 * | 4/2016 | Engdahl | F16L 37/0848 |
| 9,845,908 B2 * | 12/2017 | Brunella | F16L 37/144 |
| 2003/0001384 A1 | 1/2003 | Carroll | |
| 2005/0087245 A1 | 4/2005 | Magnus et al. | |
| 2009/0050836 A1 * | 2/2009 | Chang | F16K 15/021 |
| | | | 251/353 |
| 2010/0224258 A1 | 9/2010 | Steveley et al. | |
| 2011/0067225 A1 * | 3/2011 | Bassaco | F16D 25/08 |
| | | | 29/525.01 |
| 2013/0037141 A1 | 2/2013 | Kujawski, Jr. et al. | |
| 2015/0176738 A1 * | 6/2015 | Nezu | F16L 37/088 |
| | | | 285/321 |
| 2015/0233510 A1 * | 8/2015 | Nezu | F16L 37/088 |
| | | | 285/247 |
| 2017/0074444 A1 * | 3/2017 | Nezu | F16L 37/14 |
| 2017/0356581 A1 * | 12/2017 | Trotter | F16L 37/088 |

* cited by examiner

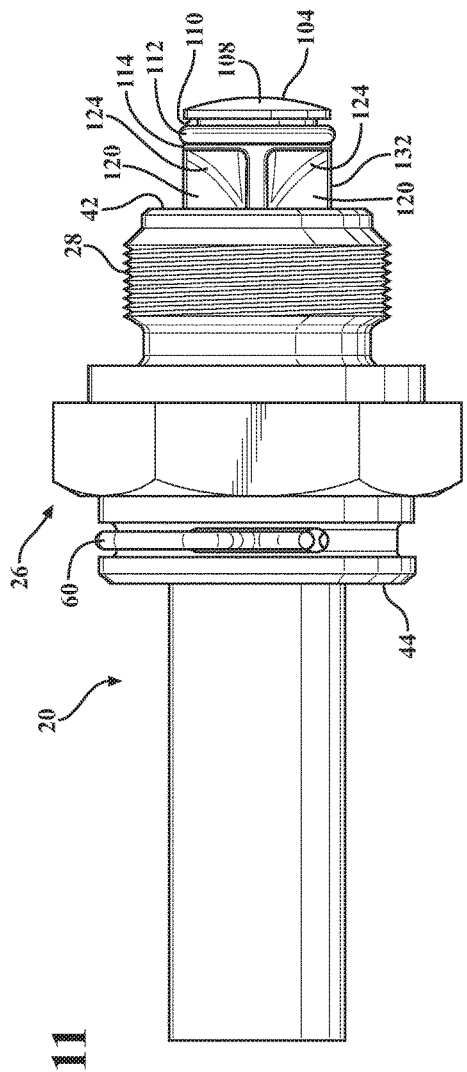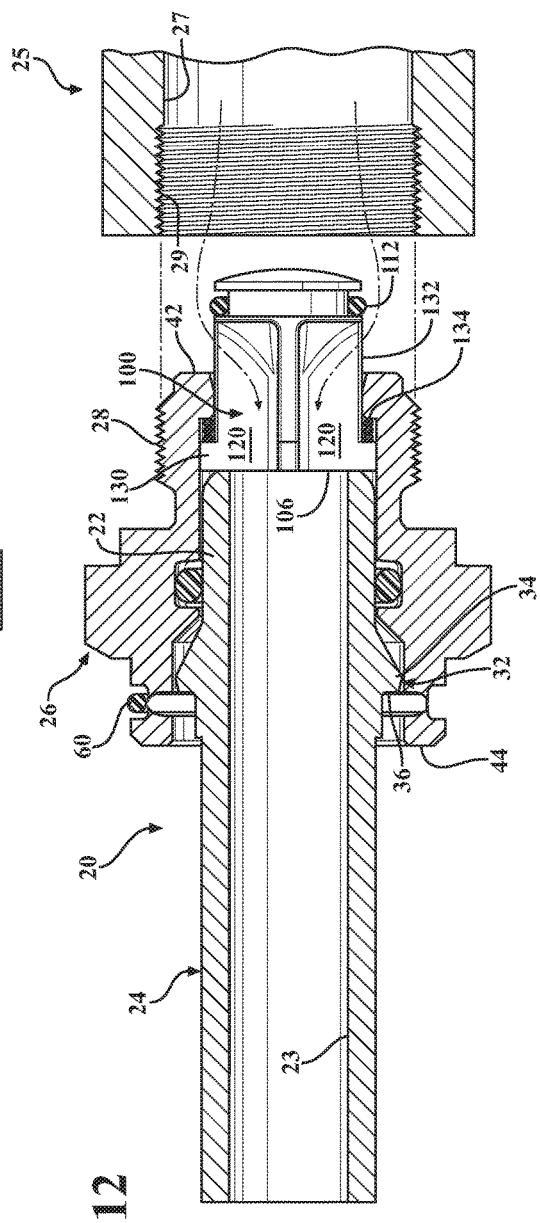
FIG. 11
FIG. 12

QUICK CONNECT FLUID COUPLING WITH INTEGRATED CHECK VALVE

CROSS-REFERENCE TO RELATED APPLICATION

This application is a non-provisional application of U.S. Provisional Application No. 62/117,635, filed Feb. 18, 2015, and claims the benefit thereof.

FIELD OF THE INVENTION

This invention is in the field of fluid couplings and includes a coupling body adapted to lockingly receive therein a tubular conduit that, when fully inserted, opens a check valve to permit through flow.

BACKGROUND

Fluid couplings are commonly used in automotive applications where, for example, coolant or lubricant is pumped from a supply point to a use point and the assembly sequence is such as to require a quick connection somewhere in the flow path.

In application Ser. No. 14/725,639, a coupling with an "assurance cap" is described. The cap provides an indication that the supply tube has been fully inserted into the coupling so as to achieve a secure connection.

BRIEF SUMMARY OF THE INVENTION

The present invention provides a fluid coupling adapted to lockingly and sealingly receive a tubular fluid conduit. The coupling includes a normally closed check valve within the flow path and near an outlet point. The valve length and the location of a lock shoulder on the tubular conduit are such that the lead end of the conduit urges the valve toward an open condition only when the conduit is fully, lockingly inserted into the coupling body. The valve has a fluted body that permits fluid to flow around the valve body and through the coupling outlet. Withdrawal of the conduit, either intentionally or otherwise, causes the valve to close.

BRIEF DESCRIPTION OF THE DRAWINGS

FIG. 11 is a side view of the coupling with the conduit fully inserted and the valve open;

FIG. 12 is a side view in section of the coupling with conduit fully seated and valve open;

DETAILED DESCRIPTION OF ILLUSTRATIVE EMBODIMENTS

Figure 1:
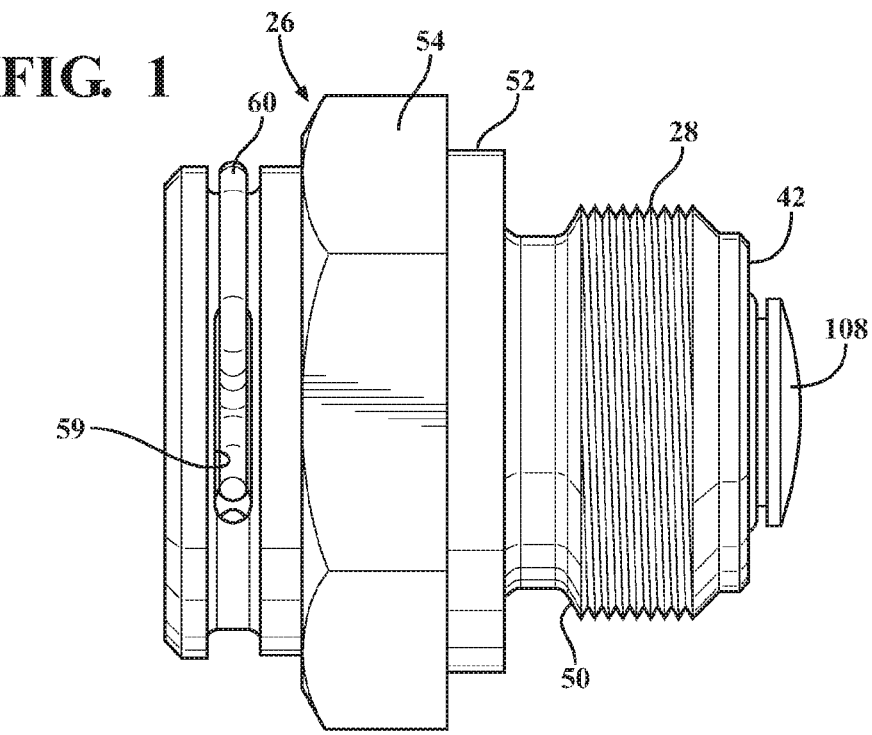
FIG. 1 is a side view of a coupling useful in an embodiment of the invention.

Referring now to FIGS. 1-12, there is depicted a quick connect fluid coupling 20, including a one-piece metal body 26 with a through bore/flow path adapted to receive one end 22 of a tubular fluid conduit 24 in a locked fluid-sealed state. The coupling body 26 is itself removably mountable in a port of a utilization component (not shown).

The tubular conduit 24 is typically made of metal, but rigid plastic material may also be employed. The tubular conduit 24 has a generally constant diameter extending from the lead end 22. A section 30 extends upstream from the lead end 22 at a first diameter to an outward extending endform 32 having a tapered conical surface 34 which terminates in a large diameter end and a radially extending, back-facing shoulder 36. A fluid path 23 extends through the tubular member 24 for fluid flow.

The coupling body 26 can be, but need not necessarily be, integrally made of a single piece of metallic or plastic material. The coupling body 26 has a through bore 40 extending from a first end 42 to a second end 44. The bore 40 need not have a constant diameter between the first and second ends 42 and 44.

An annular internal groove 46 is formed in the coupling body 26 intermediate the first and second ends 42 and 44. The groove 46 receives a seal member 48, such as an O-ring, for sealing the tubular member 24 to the coupling body 26 to prevent fluid leakage there between.

As described above, the coupling body 26 has an externally threaded end portion 28. The threaded end portion 28 is spaced from the first end 42. A recessed radially inward extending groove 50 can be formed in certain applications adjacent between one end of the threaded end portion 28 and a larger diameter annular collar 52 to receive an external seal member or washer, not shown. A hexagonally shaped portion 54 forming a plurality of hex flats 55 is formed adjacent the annular collar 52. A reduced diameter end portion 56 having a generally constant diameter extends from one end of the hexagonal portion 54 to the second end 44 of the coupling body 26. A recessed, outward opening, annular groove 58 is formed in the receiving portion 56. The groove 58 has a constant closed inner end facing the bore 40 in the coupling body 26 which is interrupted by one or more circumferentially spaced slots 59.

A resilient clip or retainer 60 is mounted in the groove 58. The clip 60 can be, but need not necessarily be, formed of a single piece of spring wire. The clip 60 can be formed with a plurality of inward extending protrusions 62 which project through the slots 59 in the groove 58, when the clip 60 is in a relaxed state behind the shoulder 36 on the tubular member 24 to lock the tubular member 24 to the coupling body 26.

When the first end 22 of the tubular member 24 is inserted into the receiving portion or socket 56 of the coupling body 26, the head portion 32 of the first end 22 of the tubular member 24 slides through the receiving portion 56 toward the first end of the coupling body 26. The inwardly extending protrusions 62 on the clip 60 seated in the groove 58 slide along the radially outward tapered endform 34 on the tubular member 24 causing the resilient clip 60 to expand radially outward moving the protrusions 62 on the clip 60 out of the bore 40 until the shoulder 36 on the endform 32 can slide past the clip 60. At this point, the protrusions 62 on the clip 60 snap radially inward into the bore 40 behind the shoulder 36 locking the tubular member 24 in the coupling body 26.

Figure 10:
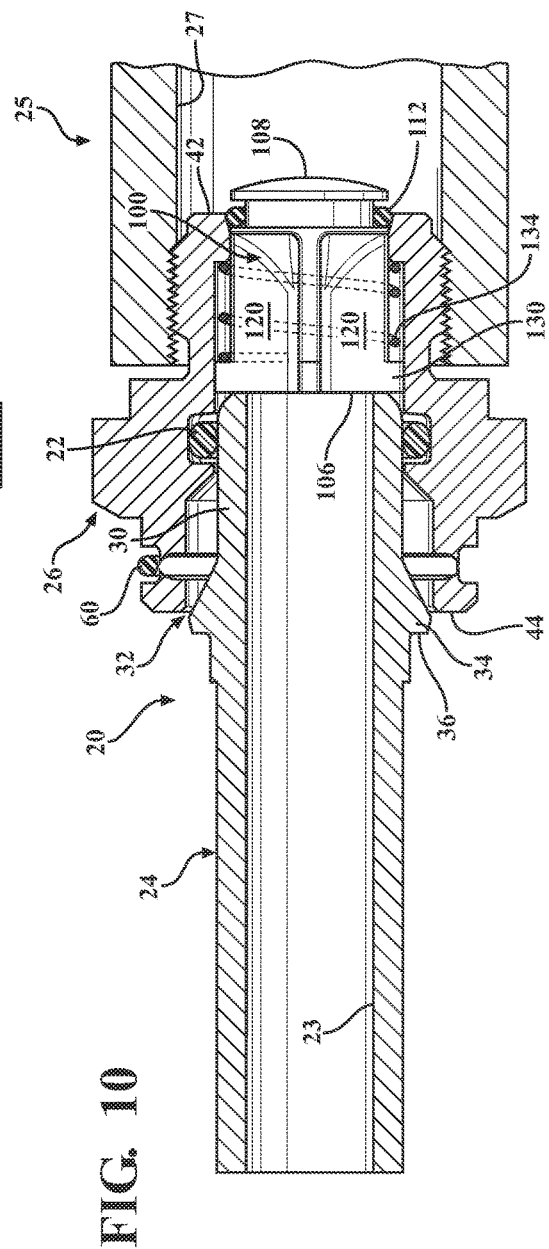
FIG. 10 is a side view in section of the coupling with the conduit partially inserted and the valve closed.
Figure 13:
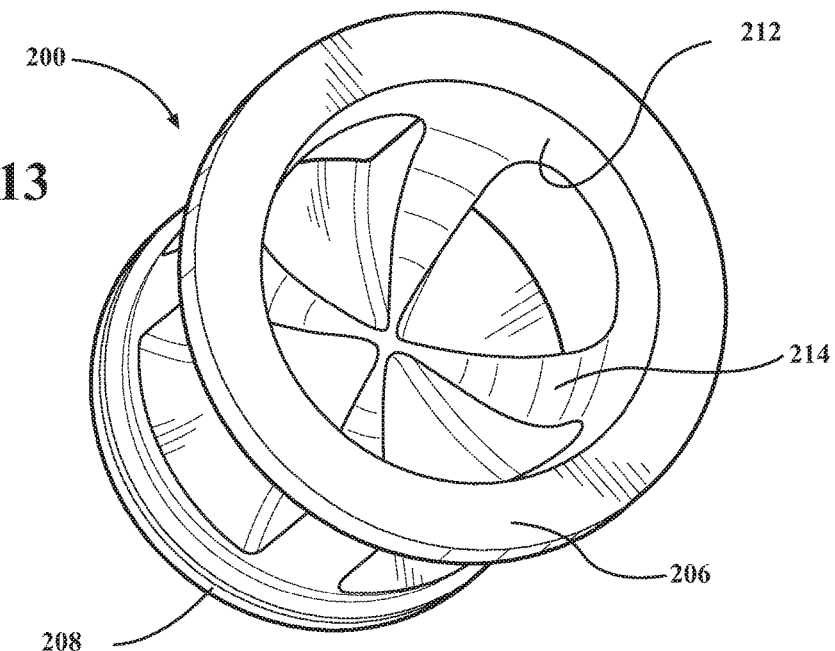
FIG. 13 is a perspective view of an alternative design for the check valve body.
Figure 14:
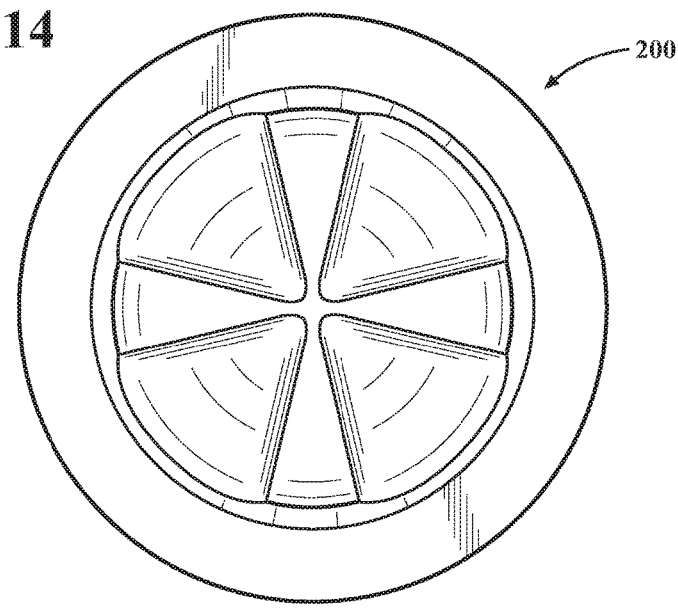
FIG. 14 is an end view of the alternative valve body.
Figure 15:
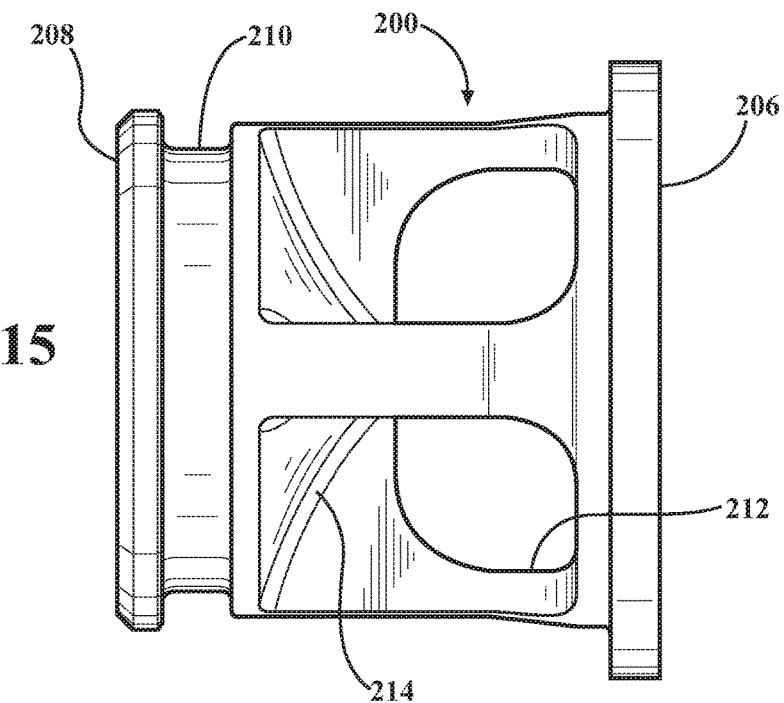
FIG. 15 is a side view of the alternative valve body.
Figure 16:
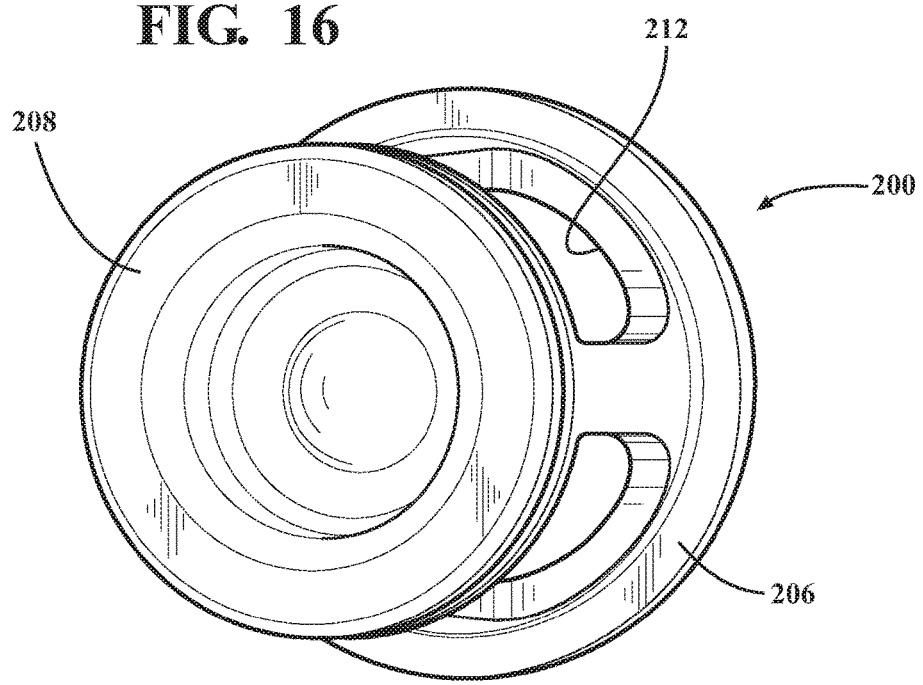
FIG. 16 is another perspective view of the check valve showing the recessed end cap.

As shown in FIGS. 10 and 12, the threads 28 on the coupling body 26 threadingly engage internal threads 29 in a bore 27 formed in an external component. This enables fluid to flow between the external component 25 and the tubular member 24, but only when the valve 100 is open as hereinafter described.

Figure 2:
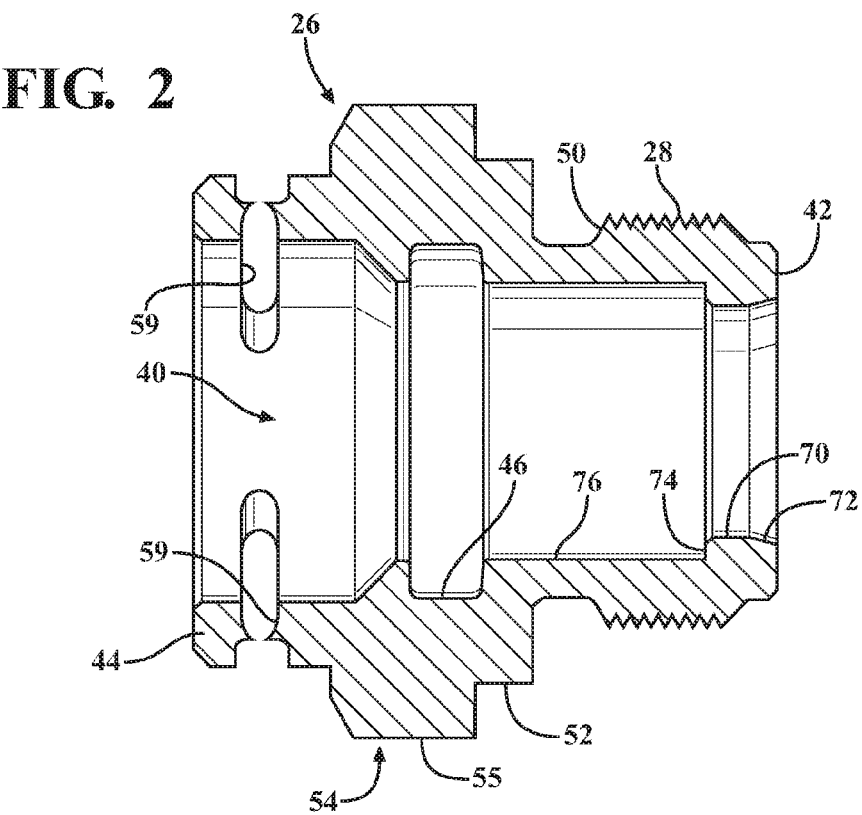
FIG. 2 is a cross-sectional view of the coupling of FIG. 1.
Figure 3:
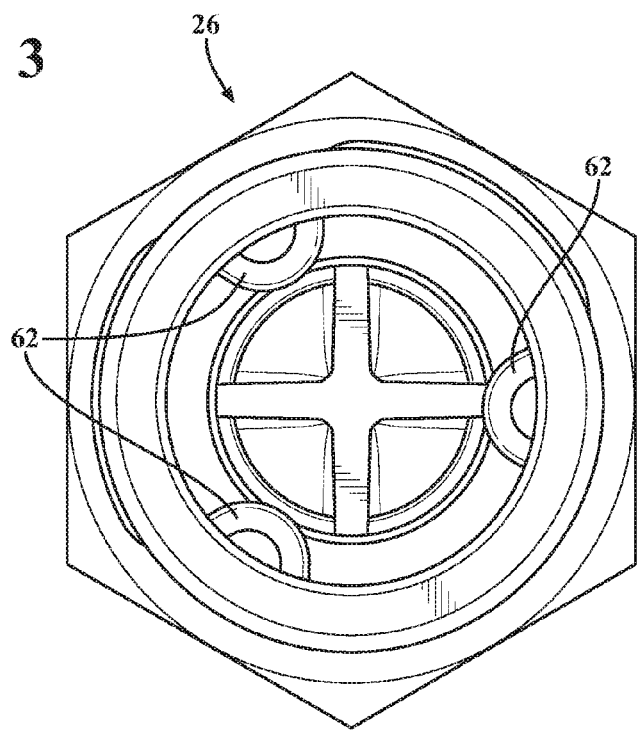
FIG. 3 is an end view of the coupling with a check valve installed.
Figure 4:
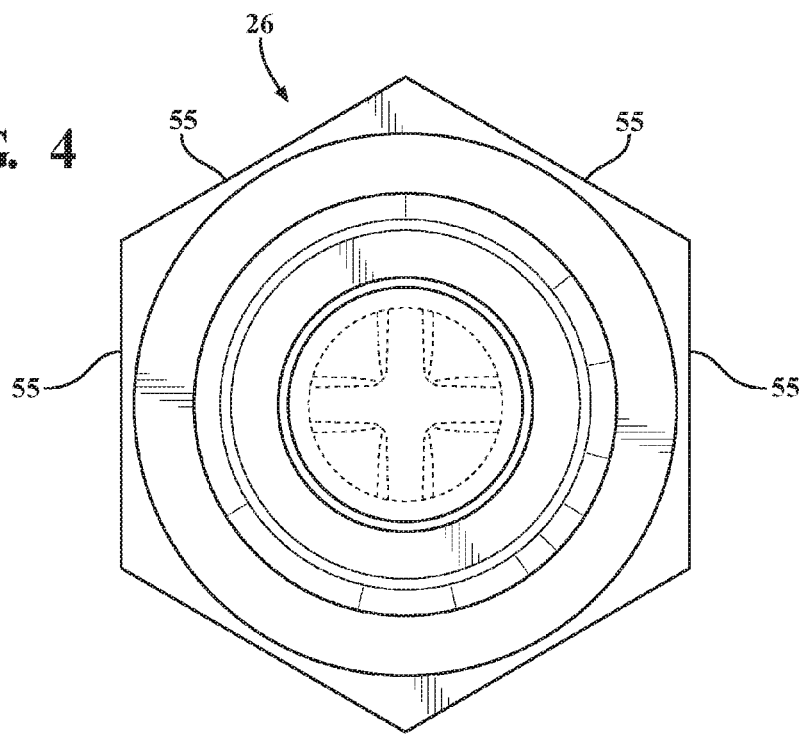
FIG. 4 is an opposite end view of the coupling.

Referring briefly to FIG. 2, the bore 40 has a radially inward extending, reduced diameter lip 70 formed at the first end 42. The lip 70 is spaced from a tapered end surface 72 adjacent first end 42 and forms an inward extending shoulder 74 which opens to a first end bore portion 76. The tapered end surface 72 forms a seal seat for a seal member and described hereafter.

A check valve 100 is axially slidably carried in the coupling body 26 in the first end bore portion 76 and is movable between a first closed position blocking or preventing fluid flow through the coupling body 26 and thus fluid flow between the bore 27 in the external component 25 and the bore 23 in the tubular member 24. The valve 100 has a second position shown in FIG. 12 allowing fluid flow between the bore 27 in the external fluid component 25 and the bore 23 in the tubular member 24.

The check valve 100 can be a one-piece body 102 formed of metal or plastic. The body 102 has a first end 104 and an opposed second end 106. A domed head 108 is formed at the first end 26 and has a larger diameter peripheral edge 109 than an adjacent recess 110. The recess 110 receives a seal member, such as an O-ring 112. An adjacent larger diameter wall 114 forms the other end of the recess 110. A fluted plunger 116 is disposed on the body 102 and extends from the wall 114 to the second end 106. The plunger 116 includes four circumferentially spaced, radially extending flutes 120 projecting radially outward from a central stem 122. The flutes 120 may be provided in any number, such as two flutes, three flutes, four flutes, etc.

Interior smoothly curved or angled surfaces 124 are formed at one end of the flutes 120 between the flutes 120 and the wall 114. The surfaces 124 provide a smooth flow directing action on the plunger 116 for fluid flow across the plunger 116, as described hereafter.

Each of the flutes 120 has an enlarged diameter end flange 130 extending radially outward to a larger diameter outer end surface spaced from a radially outer surface 132 on each flute 120. The end flanges 130 form a seat for a biasing member, such as a coil spring 134, hereafter "spring 134", which extends around the outer surface 132 of the flutes 120 between the end flange 130 on the plunger 116 and the shoulder 74 formed by the lip 70 at the first end 42 of the coupling body 26.

Figure 7:
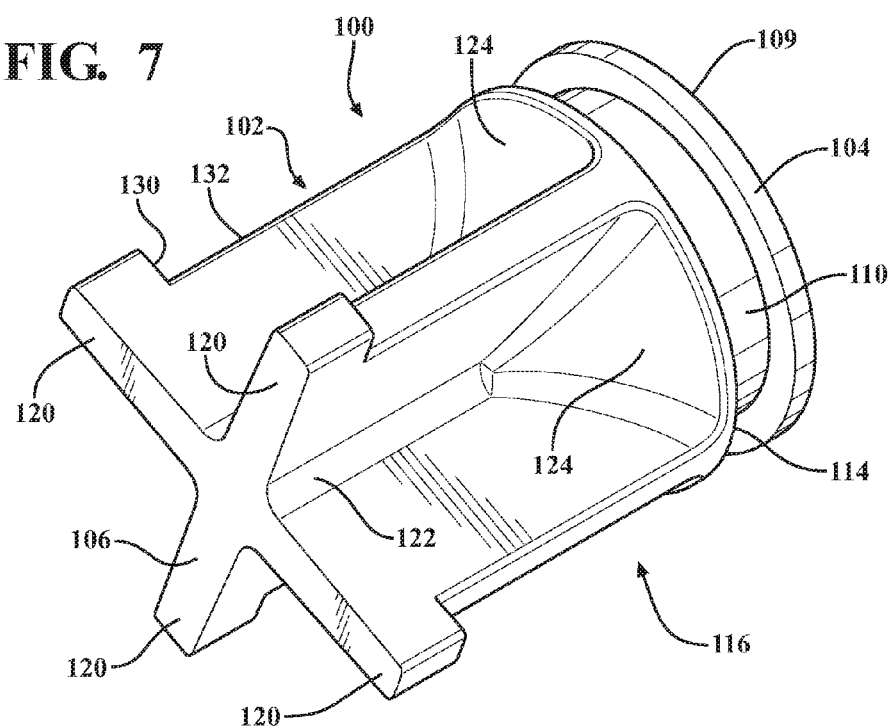
FIG. 7 is a perspective view of the check valve body.
Figure 8:
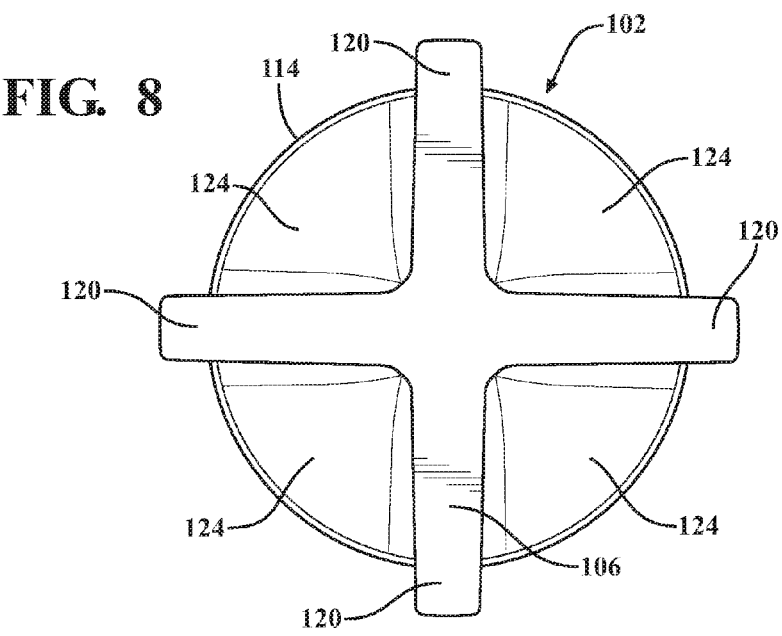
FIG. 8 is an end view of the check valve body.

Referring to FIGS. 13-16, there is shown an alternative check valve 200 that can replace the plunger 116 of FIGS. 7 and 8. The valve 200 is also one piece of metal or plastic and has a closed, solid, recessed end cap 208 and a base flange 206. The flange 206 performs the function of the shoulder 130 of plunger 116. Adjacent the end cap 208 is a seal groove 210 that receives the O-ring 112 from the embodiment of FIG. 10. Four large flow-through openings 212 are defined by ribs 214 within the valve body 200. Fluid flows through check valve 200 in the same way it flows through the valve 100 shown in FIGS. 7, 8, 12 and 13.

Assembly

Figure 5:
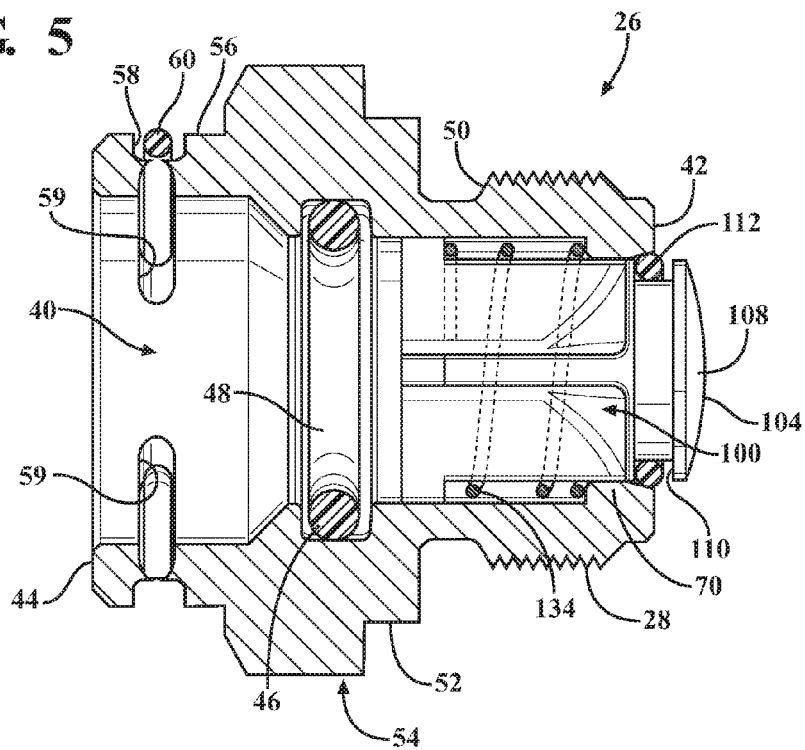
FIG. 5 is a sectional view of the coupling with the check valve in a normally closed position.
Figure 6:
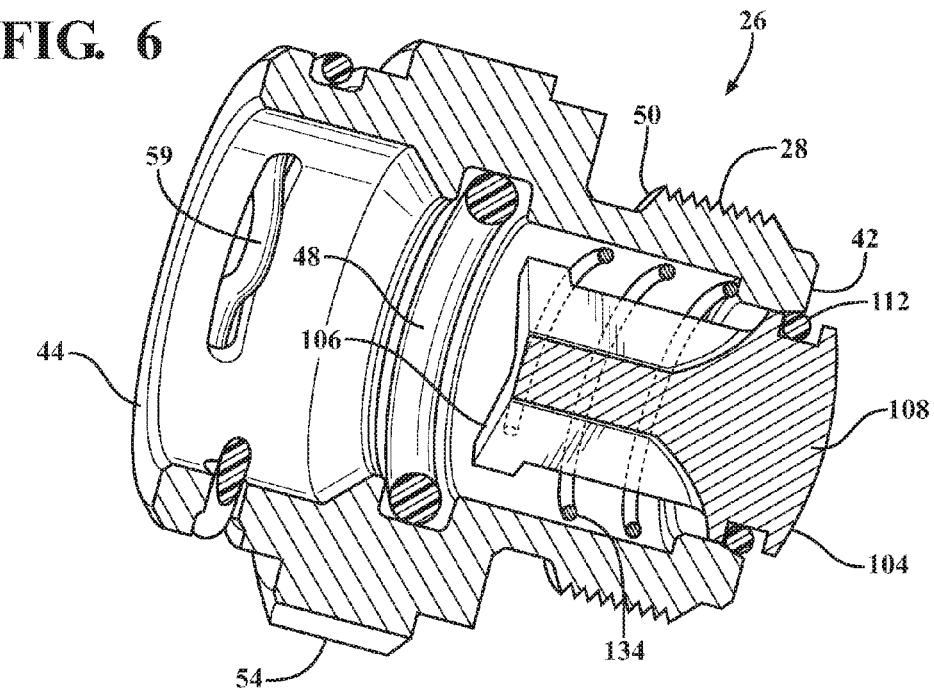
FIG. 6 is a perspective view, partly in section, of the coupling with check valve closed.

In assembling the check valve 100 or 200 in the coupling body 26, the check valve body absent the O-ring 112, is inserted through the second end 44 of the coupling body 26 until the head 108 or 208 and the edge 109 on the first end 104 of the check valve body projects through the tapered surface 72 and the first end 42 of the coupling body 26, as shown in FIG. 5.

Force is applied to move the check valve body 102 or 200 through the bore portion 76 in the coupling body 26 until the entire recess 110 or 210 on the check valve body 102 or 200 extends outward beyond the first end 42 of the coupling body 26. The O-ring 112 is then installed in the recess 110 or 210 and the force removed to allow the spring 134 to urge the check valve body 102 or 200 toward the second end 44 and retracting the head 102, 204 at the first end 104 of the check valve body 102 toward the first end 42 of the coupling body 26 until the check valve O-ring 112 sealing engages the tapered surface 72 at the first end 42 of the coupling body 26. The O-ring 112, in this position, not only seals the check valve body 102 in the bore 40 to the coupling body 26, but also retains the check valve 100 or 200 in the coupling body 26.

It will also be understood that in place of the spring 134, a one-time detent mounting arrangement may be provided to mount check valve 100 in the coupling body 26. In this aspect, a radially outward extending may be formed on one end of one or more of the flutes 120 adjacent the wall 114 to engage a detent in the form of an inward extending circumferential recess in the lip 70 adjacent the first end of the coupling body 26. Engagement of the lip in the detent retains the check valve 100 in the closed flow position until the check valve 100 is moved to the open flow position, as described hereafter, when the tubular member 26 is inserted into the bore 40 in the coupling body 26, as shown in FIG. 12.

Operation

Figure 9:
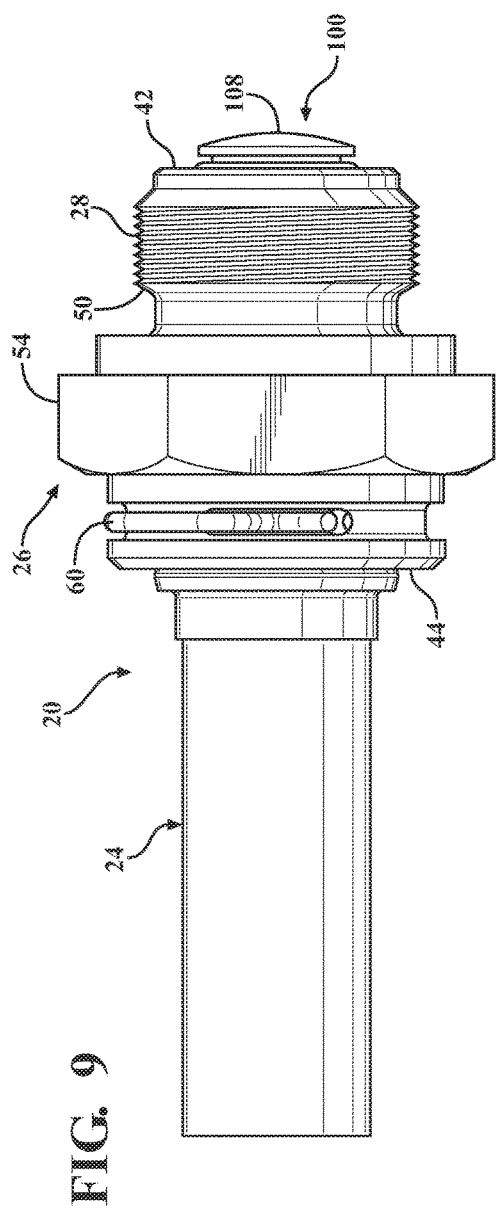
FIG. 9 is a side view of the coupling with a tubular conduit partially inserted.

In operation, prior to insertion of the tubular member 26 into the bore 40 in the coupling body 26, the spring 134 will urge the check valve 100 or 200 to the first closed position shown in FIG. 5 where the O-ring 112 closes the bore 40 at the first end 42 of the coupling body 26 to fluid flow. When insertion of the tubular member 24 into the coupling body 26 begins, as shown in FIGS. 9 and 10, the first end 22 of the tubular member 24 will engage the end 106 of the flutes 120 on the check valve body 102, as shown in FIG. 10 or the end 206 shown in FIG. 15. In this position, the check valve 100 or 200 remains in the first fluid flow closed position as the O-ring 112 is firmly engage with the tapered surface 72 with the first end 42 of the coupling body 26. Further insertion of the tubular member 24 into the bore 40 in coupling body 26 compresses the spring 134 and urges the check valve body 102 or 200 toward the second open position or toward the right in the orientation shown in FIGS. 9-12. The tubular member 24 continues to be slidably inserted into the coupling body 26 compressing the spring 134 as shown in FIG. 12. The check valve 100 or 200 is now in the second open position for fluid flow between the bore 27 in the external component 25 and the bore 23 in the tubular member 24.

If the tubular member 24 is disengaged from the retainer clip 60 on the coupling body 26, for any reason, whether intentionally or accidentally, the spring 134 will urge the check valve 100 toward the first fluid flow closed position, or to the left in the orientation shown in FIGS. 9-12, until the O-ring 112 again sealingly engages the tapered surface 76 at the first end 42 of the coupling body 26 closing off and blocking further fluid flow between the bore 23 in the tubular member 24 and the bore 27 in the external component 25.

The quick connect fluid connector with integrated check valve 100, 200 provides a number of advantages. The O-ring 112 retains the check valve body within the connector coupling body 26 without the need for additional retention elements. The check valve 100 or 200 is activated and moved between the first and second position only by insertion of the tubular member 24.

If the coupling body 26 is mounted in the external component 25 or the bore 27 of the external component 25 which functions as an outlet port carrying pressurized fluid, removal or accidental separation of the tubular member 24 from the quick coupling body 26 causes a fluid shutoff, when the tubular member 24 is disconnected from the coupling body 26. This shutoff feature also allows a customer to ship the external component 25 in a fluid-filled position as the check valve 100 in the quick coupling body 26 will be in the fluid flow closed position prior to insertion of the tubular member 24 into the coupling body 26.

The quick connector 26 with integrated check valve 100 or 200 can also be used by a customer who manufactures or installs the external component 25 to eliminate the need for insertion of the test plug into the bore 27 in the port of the external component 25, as well as to eliminate the need for a separate shipping plug when the external component 25 is shipped to an assembly location. This eliminates the need to remove a separate shipping plug prior to tubular member installation and also provides higher sealing capability for a higher pressure leak test.

The quick connector 26 with integrated check valve 100 or 200 is ideal for certain automotive applications, such as turbo engine applications, where the fluid fitting can be used as a shut-off valve when the tubular member 24 is accidentally disconnected on the assembly. This will minimize the potential for thermal events should fluid spray from the disconnected tubular member flow onto adjacent hot turbo application components.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A quick connect fluid coupling, comprising:
   a coupling body, including:
      an inlet;
      an outlet;
      a throughbore extending from the outlet to the inlet; and,
      a circumferential groove arranged proximate the outlet, the circumferential groove comprising one or more slots;
   a check valve axially displaceably mounted in the inlet, the check valve including:
      an interior end;
      an exterior end;
      a plurality of concave surfaces arranged proximate the exterior end; and,
      one or more ribs separating the plurality of concave surfaces, each of the one or more ribs comprising:
         a radially outward facing surface; and,
         a concave radially inward facing surface;
   a bias spring operatively disposed between the coupling body and the check valve;
   a retainer arranged in the groove, the retainer including at least one protrusion extending through the one or more slots; and,
   a tubular conduit having a first end operatively arranged to be inserted in the throughbore, wherein:
      when fully inserted within the coupling body the retainer locks the tubular conduit therein and the check valve is displaced to an open position; and,
      when not fully inserted within the coupling body the tubular conduit is not locked and the check valve is in a closed position.

2. The quick connect fluid coupling as recited in claim 1, wherein the bias spring is retained within the coupling body and operatively arranged to bias the check valve toward the closed position.

3. The quick connect fluid coupling as recited in claim 1, wherein the bias spring is concentrically arranged around the check valve to bias the check valve toward the closed position.

4. The quick connect fluid coupling as recited in claim 1, wherein the bias spring is compressed when the first end engages the interior end to displace the check valve to the open position.

5. The quick connect fluid coupling as recited in claim 1, wherein the tubular conduit further comprises a shoulder operatively arranged proximate the first end to engage the at least one protrusion.

6. The quick connect fluid coupling as recited in claim 1, wherein the check valve comprises a first concave surface, a second concave surface, a third concave surface, and a fourth concave surface, and the first concave surface is separated from the second concave surface by a first rib, the second concave surface is separated from the third concave surface by a second rib, the third concave surface is separated from the fourth concave surface by a third rib, and the fourth concave surface is separated from the first concave surface by a fourth rib.

7. The quick connect fluid coupling as recited in claim 1, wherein each of the one or more ribs comprises a respective end flange.

8. The quick connect fluid coupling as recited in claim 1, wherein each of the one or more ribs extends radially outward from a control stem.

9. The quick connect fluid coupling as recited in claim 1, wherein each of the one or more ribs comprises a width that gradually increases in a radially outward direction.

10. The quick connect fluid coupling as recited in claim 1, wherein an area in a circumferential direction between each of the one or more ribs forms a respective opening.

11. The quick connect fluid coupling as recited in claim 1, wherein the one or more ribs extend from the exterior end to the interior end.

12. The quick connect fluid coupling as recited in claim 11, wherein the one or more ribs are connected to a flange on the interior end.

13. The quick connect fluid coupling as recited in claim 1, wherein the check valve further comprises:
   a seal arranged proximate the exterior end, wherein in the closed position the exterior end is sealingly engaged with the coupling body; and,
   a plurality of flow paths extending axially between the exterior end and the interior end.

14. The quick connect fluid coupling as recited in claim 13, wherein the seal is arranged to abut against the inlet in the closed position.

15. The quick connect fluid coupling as recited in claim 13, wherein the check valve further comprises an end cap on the external end.

16. The quick connect fluid coupling as recited in claim 15, wherein the end cap is domed.

17. The quick connect fluid coupling as recited in claim 15, wherein:
- the check valve further comprises a circumferential recess arranged axially between the external end and the end cap; and,
- the seal is arranged in the recess.

18. The quick connect fluid coupling as recited in claim 15, wherein the end cap comprises a recess extending in an axial direction toward the interior end.

19. The quick connect fluid coupling as recited in claim 18, wherein the recess comprises a profile that is at least partially concave.

* * * * *